United States Patent [19]

Naarmann et al.

[11] 4,277,588

[45] Jul. 7, 1981

[54] PREPARATION OF ACETYLENE COPOLYMERS

[75] Inventors: Herbert Naarmann, Wattenheim; Klaus Penzien, Frankenthal; Helmut Doerfel, Heidelberg; Albrecht Eckell, Frankenthal, all of Fed. Rep. of Germany

[73] Assignee: BASF Aktiengesellschaft, Fed. Rep. of Germany

[21] Appl. No.: 129,828

[22] Filed: Mar. 13, 1980

[30] Foreign Application Priority Data

Mar. 29, 1979 [DE] Fed. Rep. of Germany ....... 2912572

[51] Int. Cl.$^3$ ........................... C08F 4/64; C08F 4/68; C08F 38/02; C08F 38/04
[52] U.S. Cl. .................................. 526/114; 526/115; 526/159; 526/285
[58] Field of Search ............... 526/285, 172, 115, 114, 526/159

[56] References Cited

FOREIGN PATENT DOCUMENTS 901326  4/1960  United Kingdom ..................... 526/285

OTHER PUBLICATIONS

J. Chem. Soc. Japan, Ind. Chem. Sec. 65, (1962), p. 723 et. seq.
Trans. Farad. Soc. 64, (1968), p. 823, et. seq.
J. Chem. Soc. Chem. Comm., (1977), p. 578 et seq.
Journal of Pol. Sci. Part A-1, 10, 2033-2043, (1972).

Primary Examiner—Stanford M. Levin
Attorney, Agent, or Firm—Keil & Witherspoon

[57] ABSTRACT

A process for the preparation of acetylene copolymers by catalytic polymerization of a mixture of acetylene and dialkynes or polyalkynes, using Ziegler catalysts. The novel polymers may be used as colored pigments, as colored coatings for metal, glass or plastics, and for the production of electrical or magnetic components.

4 Claims, No Drawings

PREPARATION OF ACETYLENE COPOLYMERS

The present invention relates to the preparation of acetylene copolymers by polymerizing mixtures of acetylene and dialkynes or polyalkynes with Ziegler catalysts.

The preparation of polyacetylenes by polymerizing acetylene has been disclosed, for example by Hatano in J. Chem. Soc. Japan, Ind. Chem. Sec. 65 (1962), 723 et seq. and D. J. Berets et al., Trans. Farad. Soc. 64 (1968), 823 et seq. A more recent publication by H. Shirakawa et al., J. Chem. Soc. Comm. (1977), 578, also describes the polymerization of acetylene to polyacetylenes with Ziegler catalysts. Using the above methods, products are obtained which are completely insoluble in conventional solvents and are black, amorphous or partially crystalline materials.

It is an object of the present invention to provide a process for the preparation of novel acetylene copolymers which have advantageous properties.

We have found that this object is achieved by a process wherein mixtures of acetylene and dialkynes or polyalkynes are polymerized.

Accordingly, the present invention relates to a process for the preparation of acetylene copolymers by catalytic polymerization of acetylene with Ziegler catalysts, wherein mixtures of acetylene and dialkynes or polyalkynes are polymerized.

Examples of suitable comonomers to use with acetylene are butadiyne, hexadiyne, octadiyne, diethynylbenzene, 1,3,5-triethynylbenzene, 1,2,4-triethynylbenzene, 1,3,5-tris-trimethylsilyl-ethynyl-2,4,6-trimethylsilylbenzene and 1,3,5-tris-propyn-1-yl-2,4,6-trimethylbenzene. Most advantageously, monomer mixtures which contain up to 50 mole % of dialkynes or polyalkynes, preferably from 5 to 20 mole % of dialkynes or polyalkynes, are used.

The polymerization is most advantageously carried out with Ziegler catalysts which have been prepared from mixtures of aluminum-trialkyls and titanium tetraoxyalkyls. Examples of suitable aluminum-trialkyls are aluminum-triethyl, aluminum-triisobutyl and aluminum-trioctyl, the last-mentioned being preferred.

The titanium tetraoxyalkyls used are advantageously those where alkyl is of 1 to 10 carbon atoms; in particular, titanium tetraoxybutyl has proved suitable. The weight ratio of aluminum-trialkyl to titanium tetraoxyalkyl in the mixture is from 0.5:1 to 1:0.5, preferably about 1:1.

Metal carbonyls, eg. iron carbonyl, nickel carbonyl, manganese carbonyl, cobalt carbonyl or molybdenum carbonyl, may also be added to the Ziegler catalysts. The weight ratio of metal carbonyls to aluminum-trialkyl in the mixture is from 0.5:1 to 1:0.5, preferably 1:1.

The catalyst mixture is used in an amount of from 0.1 to 10 parts per 100 parts of the mixture of acetylene and other alkynes. The polymerization temperature is advantageously from $-90°$ to $+100°$ C., preferably from $-30°$ to $+30°$ C. The polymerization is advantageously carried out at from 0.1 to 500 bar, preferably at about 50 bar.

The polymerization can for example be carried out in an auxiliary fluid. Suitable materials are fluids which are inert toward the polymerization catalysts and toward the monomers, eg. aliphatic oils, aromatics and cycloaliphatics, but also petroleum ether, naphtha and cyclopentadiene. The auxiliary fluids are employed in a weight ratio of the alkynes of from 1:1 to 1,000:1, preferably a ratio of the order of 10:1. The catalysts may be introduced initially, together with the auxiliary fluid, and/or be added continuously during the polymerization.

However, it is also possible to polymerize the monomers in the gas phase. In that case, it is advisable to introduce into the polymerization vessel a carrier which may consist of fine polymer powder or of other materials, for example graphite. The catalysts are then introduced as a slurry in the auxiliary fluids, and after the polymerization has taken place the solvents are stripped off.

The process gives copolymers of acetylene with dialkynes or polyalkynes which are virtually insoluble. The novel polymers may be used as colored pigments or, because of their film-forming tendency, as colored coatings on metals, glass or plastics; they are also of interest because of their electrical and magnetic properties.

EXAMPLE

Preparation of the catalysts 4.57 g of aluminum-triethyl (40 millimoles) were mixed with 50 ml of toluene. 3.4 g of titanium tetraoxybutyl (10 millimoles) were then added. The resulting solution was shaken and left to stand for about 10 minutes, during which it assumed a blackish brown color. In some of the experiments, metal carbonyls were added. The amounts of catalyst required were taken from the solution by means of a syringe, and added to the reaction batches.

EXAMPLE 1

Copolymerization of acetylene with dialkynes or polyalkynes

In each case, 40 ml of acetylene were dissolved in 50 ml of toluene in a 100 ml round-bottomed flask, to give a saturated solution. Various amounts of dialkynes or polyalkynes were then added and, after mixing, 10 ml of the above catalyst solution were added.

After 24 hours at 0° C., 20 ml of a solution of hydrochloric acid in methanol were added. The black precipitates were filtered off and washed with methanol. The results are shown in Table I.

TABLE 1

| No. | Metal carbonyl added | Acetylene mg | Dialkyne or polyalkyne mg | Insoluble polymer mg |
|---|---|---|---|---|
| 1 | | 400 | 400 butadiyne | 730 |
| 2 | | 400 | 200 butadiyne | 590 |
| 3 | | 400 | 100 butadiyne | 360 |
| 4 | | 400 | 400 1,3,5-triethynyl-benzene | 740 |
| 5 | | 400 | 300 1,3,5-triethynyl-benzene | 620 |
| 6 | | 400 | 200 1,3,5-triethynyl-benzene | 580 |
| 7 | | 400 | 100 1,3,5-triethynyl-benzene | 790 |
| 8 | Iron carbonyl, 5.0 g | 400 | 100 1,3,5-triethynyl-benzene | 495 |
| 9 | Cobalt carbonyl, 5.0 g | 400 | 100 1,3,5-triethynyl-benzene | 495 |
| 10 | Nickel carbonyl, 5.0 g | 400 | 300 1,3,5-triethynyl-benzene | 680 |

EXAMPLE 2

Preparation of copolymers

A 500 ml vessel was evacuated and flushed with nitrogen, after which 100 ml of toluene and 20 ml of the above catalyst solution were introduced. The reaction vessel was cooled to −50° C. After this temperature had been reached, mixtures of acetylene with various amounts of dialkynes of polyalkynes were introduced into the fluid. After the polymerization had ended, the fluid was siphoned from the reaction vessel and the mixture from the reaction vessel was suction-filtered. The resulting copolymers were washed and dried.

The results are summarized in Table 2.

TABLE 2

| No. | Acetylene (mg) | Dialkyne or polyalkyne (mg) | Insoluble polymer (mg) |
|---|---|---|---|
|   |   | hexadiyne |   |
| 1 | 40 | 00 | 40 |
| 2 | 40 | 30 | 68 |
| 3 | 40 | 60 | 98 |
| 4 | 40 | 100 | 135 |
| 5 | 40 | 200 | 225 |
| 6 | 40 | 300 | 330 |
| 7 | 40 | 500 | 532 |
| 8 | 40 | 1,000 | 1,030 |
| 9 | 40 | 3,000 | 3,030 |
|   |   | octadiyne |   |
| 10 | 40 | 60 | 96 |
| 11 | 40 | 160 | 194 |
| 12 | 40 | 460 | 480 |
|   |   | 1,3,5-triethynyl-benzene |   |
| 13 | 40 | 160 | 200 |

We claim:

1. A process for the preparation of acetylene copolymers by the catalytic polymerization of a mixture of (a) acetylene and (b) dialkynes or polyalkynes with a Ziegler catalyst, wherein
    (1) the Ziegler catalyst is prepared from an aluminum-trialkyl and a titanium tetraoxyalkyl in a molar ratio of from 0.5:1 to 1:0.5,
    (2) the weight ratio of the mixture to be polymerized to the Ziegler catalyst is from 100:0.1 to 100:10,
    (3) the polymerization is carried out at from −90° to +100° C. and from 0.1 to 500 bar,
    (4) the dialkynes or polyalkynes are selected from the group consisting of butadiyne, hexadiyne, octadiyne, diethynylbenzene, 1,3,5-triethynylbenzene, 1,2,4-triethynylbenzene and 1,3,5-trispropyn-1-yl-2,4,6-trimethylbenzene, and
    (5) the mixture to be polymerized contains up to 50 mole% of dialkynes or polyalkynes.

2. A process as set forth in claim 1, wherein the Ziegler catalyst contains, in addition to the aluminum-trialkyl and titanium tetraoxyalkyl, a metal carbonyl selected from the group consisting of iron carbonyl, nickel carbonyl, manganese carbonyl, cobalt carbonyl and molybdenum carbonyl, in a molar ratio of metal carbonyl to aluminum-trialkyl of from 0.5:1 to 1:0.5.

3. A process for the preparation of acetylene copolymers as set forth in claim 1, wherein the mixture of acetylene and dialkynes or polyalkynes is polymerized in an auxiliary fluid.

4. A process for the preparation of acetylene copolymers set forth as in claim 1, wherein the polymerization is carried out in the presence of a carrier.

* * * * *